B. V. TAMPLIN.
Implements for Rolling, Guiding, and Controlling Barrels, &c.
No. 138,055. Patented April 22, 1873.
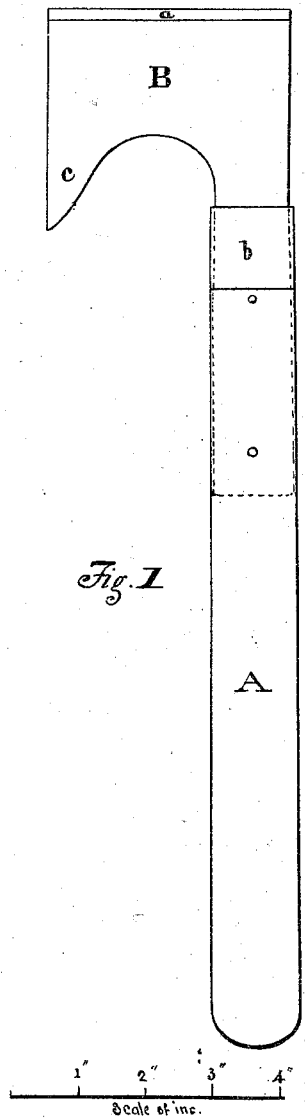
Fig. 1.
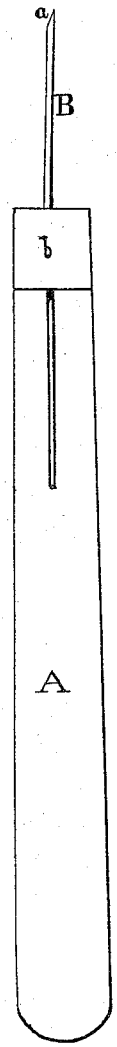
Fig. 2.
Fig. 3.
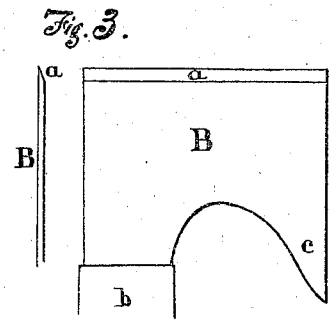
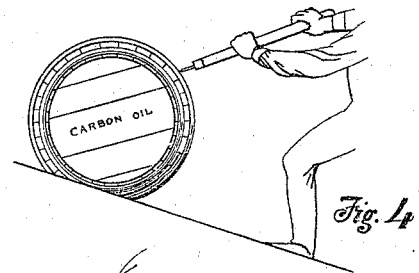
Fig. 4.
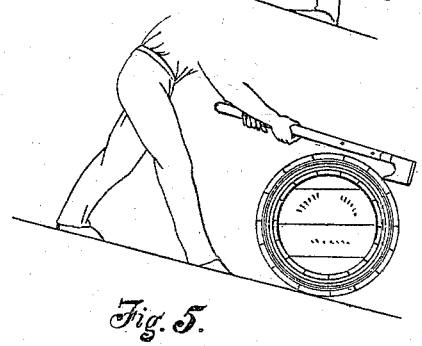
Fig. 5.
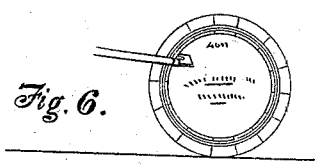
Fig. 6.
Witnesses
John Lancaster
Marion Vincent
Benjamin V. Tamplin
by Edmund Thurston,
his Atty in fact

UNITED STATES PATENT OFFICE.

BENJAMIN V. TAMPLIN, OF PEORIA, ILLINOIS.

IMPROVEMENT IN IMPLEMENTS FOR ROLLING, GUIDING, AND CONTROLLING BARRELS, &c.

Specification forming part of Letters Patent No. 138,055, dated April 22, 1873; application filed March 15, 1873.

*To all whom it may concern:*

Be it known that I, BENJAMIN V. TAMPLIN, of the city of Peoria, in the county of Peoria and State of Illinois, have invented an Implement for Rolling, Guiding, and Controlling Barrels or Casks, &c.; and do hereby declare that the following is a full, clear, and exact description thereof, reference being had to the annexed drawing making a part of this specification, in which like letters of reference refer to like parts, and in which—

Figure 1 represents a front view of the implement; Fig. 2, a side view; Fig. 3, a left-handed implement, the blade being reversed. Fig. 4 illustrates the use of the implement in rolling barrels, &c., forward; Fig. 5, the use of the same in controlling the too rapid descent of a barrel when going down an inclination. Fig. 6 shows the use of the hook in turning a barrel by pulling one end of the latter toward the operator.

This invention consists of an implement with a handle bearing a transverse broad steel blade or chisel, the beveled edge of which is transverse of the handle and set in the latter, one side of which is elongated at a right angle from the chisel-edge and parallel with a handle into a hook, which is designed to catch the chimes of the cask or barrel to turn the course of the same in rolling, the chisel-edge being used to obtain a hold on the "bilge" of a barrel in rolling the latter forward without abrasion of the staves.

In the drawing, A represents the handle, which is round, of a length of about thirty inches, and has a slit in the forward end to admit the stem of the blade, which part is covered with a "ferrule," $b$. The "stem" of the blade B may be made flat to enter the slit, and be retained by pins or rivets passing through both blade and handle; or the stem may be made square or round, but the flat stem is the best form. B, the hooked chisel, which consists of a broad blade of iron or steel, square in form similar to a chisel, and with a beveled edge at the same part where a chisel has its cutting-edge, which sharp edge is about three and a half inches in length, identical with the width of the implement, and about two and a half inches deep to the ferrule $b$. One side of the blade is recessed, leaving at the outer edge a hook or tapering point, $c$, pointing backward parallel with the handle and terminating at a distance of about two and a half inches from the chisel-edge $a$. This hook is for the insertion of the implement within the chimes of the cask or barrel to guide or turn the latter. The implement may be constructed with a hook, $c$, on either side of the chisel B, so as to combine the two forms—*i. e.*, of a "left-hand" implement and a right-hand one; but with a single-hook implement it is necessary to have a right-hand one and a left-hand one, the form or outline being the same in both; but the edge $a$ is beveled in the right-handed implement, Fig. 1, and held in the same position when in use as that of a chisel, the beveled parts being upward, and vice versa. This edge may be serrated or it may be hollowed with a concave cutting-edge; but either of these latter forms would damage the barrel, whereas the straight sharp edge leaves no mark.

The operation of this invention is as follows: The implement is used in one or both hands in rolling barrels or casks on a level surface or up or down hill, the broad edge of the blade (beveled part up) being inclined downward against the barrel, (the long "bearing" of said edge keeping the barrel in a straight course,) against which it is pressed, so urging the barrel along. If the latter turns from its course it is readily righted by inserting the hook $c$ under the "chime" which is advancing the fastest, and pulled back into the desired course. If the barrel is going too fast it is readily retarded by the use of the hook applied to the "bilge" or greatest diameter of the barrel. The hook is also useful in "retarding" a barrel down a slope in a similar manner.

The advantages of this implement are, first, that handling and rolling barrels is done with half the labor and time commonly used. Second, very slight inclination of the operator's back is necessary; and he may even work with gloved hands without damage to the gloves. Third, barrels can be "slowed" down an incline when desired with little of the ordinary strain expended in doing the same by hand. Fourth, in the facility of singling out and extracting a barrel from an end-to-end "tier" by inserting the hook c between the adjoining "heads," &c., turning the barrel out of the line without jeopardy to the fingers or hand—all this without any abrasion or cutting of the barrel. The sharp edge a, forming a sharp "hold" upon the barrel, does not enter far enough to abrade the wood.

What I claim as my invention is—

1. An implement or tool for rolling barrels or casks having a chisel shape and a similar beveled edge, whether serrated or curved between the outer corners, with a lateral hook, c, on one or on either side, or on both sides of the blade B, substantially as and for the purposes described.

2. The implement for rolling, checking, and turning barrels or casks, having a straight chisel-edge, a, in combination with a lateral hook, c, forming part of the same, set in the handle A, substantially as described.

In testimony that I claim the foregoing implement for rolling barrels, &c., I have hereunto set my hand this 5th day of March, A.D. 1873.

BENJAMIN V. TAMPLIN.

Witnesses:
 JAMES THURLOW,
 JOHN CAMERON.